April 27, 1971 F. DAVIS 3,576,761
THERMOMETRIC COMPOSITIONS COMPRISING ONE MESOMORPHIC
SUBSTANCE, ONE CHOLESTERYL HALIDE, AND AN OIL
SOLUBLE DYE SELECTED FROM THE GROUP
CONSISTING OF DISAZO, INDULENE, AND
NIGROSINE DYES
Filed March 18, 1969

United States Patent Office 3,576,761
Patented Apr. 27, 1971

3,576,761
THERMOMETRIC COMPOSITIONS COMPRISING ONE MESOMORPHIC SUBSTANCE, ONE CHOLESTERYL HALIDE, AND AN OIL SOLUBLE DYE SELECTED FROM THE GROUP CONSISTING OF DISAZO, INDULENE, AND NIGROSINE DYES
Frederick Davis, Pittsburgh, Pa., assignor to Liquid Crystal Industries, Turtle Creek, Pa.
Filed Mar. 18, 1969, Ser. No. 808,111
Int. Cl. G01k 11/16, 11/18
U.S. Cl. 252—408     16 Claims

ABSTRACT OF THE DISCLOSURE

Novel thermometric compositions capable of retaining an indication that they have exceeded a given temperature, which compositions comprise a mixture of at least one mesomorphic substance and at least one cholesteryl halide, the mixture exhibiting color in the cholesteric state at a first temperature and changing from that state at a second temperature, and an amount of oil-soluble dye sufficient to prevent the mixture from reverting to the color of the cholesteric state when the compositions are returned to the first temperature; thermometric elements comprising such compositions; and thermometric articles comprising said compositions.

BACKGROUND OF THE INVENTION

Figure 1:
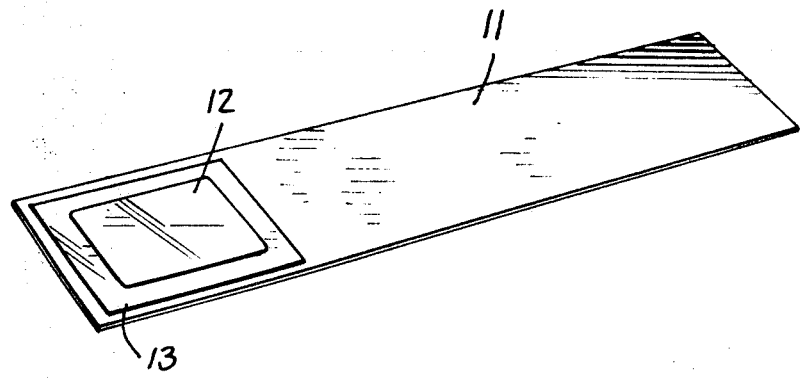

Mesomorphic or "liquid crystalline" materials have long been known and have been classified into three types: smectic, nematic, and cholesteric. The cholesteric mesomorphic phase exhibits a number of optical properties which have attracted interest. One property is the scattering of white light, which property varies with temperature over a certain range, depending upon the particular cholesteric material.

This variable scattering of light is manifested as an apparent change in color of the cholesteric material and has been exploited for measuring transient changes in temperature occasioned by infrared radiation, microwave radiation, conduction, and convection. In this use the cholesteric material responds relatively rapidly so that a change in temperature quickly causes a change in the apparent color of the material. While this property may be most useful in some applications, the fleeting nature of the color changes is not capable of providing any permanent record.

THE INVENTION

Briefly, the present invention provides thermometric compositions, elements, and articles which will record temperature changes, either permanently or for some shorter time. The compositions comprise a mixture of one or more cholesteric substances and one or more cholesteryl halides, together with an amount of oil-soluble dye sufficient to obstruct reversion of the mixture to the cholesteric state after said mixture has been subjected to a temperature at which it does not exhibit color in the cholesteric state. The invention also contemplates thermometric elements embodying such compositions and thermometric articles which can be used for purposes of measuring fleeting temperatures and recording the evidence of such temperatures.

It will be understood herein that a cholesteric substance is one which exists in the cholesteric state at a certain temperature. The cholesteric state of such a substance exists in the region between the temperature at which the substance behaves as a true liquid and the temperature at which the substance is a solid. In the cholesteric state the substance is optically negative, has a strong rotatory power, scatters light to give vivid colors (or monochromatic light to give areas of darkness and brightness), and shows circular dichroism. Such a physical state is especially notable in derivatives of cholesterol and like materials, although a relatively few other substances such as optically active amylcyanobenzylidineaminocinnamate do exhibit the cholesteric state.

The cholesteric substances herein contemplated will be in the cholesteric state within at least a certain temperature range, but as the temperature is raised above, or depressed below, this range the substances will pass into another mesomorphic state or into the liquid or solid state. Thus, the cholesteric substance will be in the cholesteric state at a first temperature and will change its phase into some other state at a second temperature. Generally, it is preferred in the practice of this invention that the second temperature be higher than the first temperature. The range of temperatures within which visible colors are displayed as a result of scattering of white light from the cholesteric substances will also be referred to as the color play range.

Cholesteric substances used according to the present invention can be chosen from a wide range of compounds exhibiting the cholesteric phase. Derivatives of cyclopentanophenanthrene are desirably used. There are a number of factors to be considered in selecting such derivatives: All of the ring systems should be in the trans configuration, the 3-substituent (on the A ring) should be in the β-configuration, and there should be no more than two axial methyl groups. Unsaturation at the 5,6 carbon atom bond can have an effect on the melting point, but otherwise has little effect on the formation of the cholesteric phase. Thus, derivatives of such cyclopentanophenanthrenes as cholesterol, campesterol, ergosterol, β-sitosterol, stigmasterol, and like materials can be used.

It is preferred in the present invention to utilize alkyl and aryl derivatives of the cyclopentanophenanthrene materials, particularly those derivatives which are esters of alkanoic or aralkanoic acids, or mixed alkyl esters of the cyclopentanophenanthrene material and carbonic acid. The alkanoic acids used can contain from one to 24 or more carbon atoms in the molecule, and can be saturated or unsaturated and straight or branched chain. It is preferred to utilize esters comprising higher fatty acids containing from 9 to 22 carbon atoms or lower saturated or unsaturated phenalkanoic acids having 1 to 3 carbon atoms, and mixed carbonate esters comprising alkanols having from one to 22 carbon atoms and cholesterol are also among the preferred cholesteric substances.

Such derivatives of cholesterol are presently preferred in certain aspects of the invention. Thus, useful cholesteric substances include cholesteryl nonanoate, cholesteryl caprylate, cholesteryl laurate, cholesteryl palmitate, cholesteryl stearate, cholesteryl arachidate, cholesteryl behenate, cholesteryl oleate, cholesteryl linoleate, and cholesteryl linolenate, cholesteryl benzoate, cholesteryl cinnamate, cholesteryl dihydrocinnamate, and the like. Carbonate esters such as oleyl cholesteryl carbonate, stearyl cholesteryl carbonate, methyl cholesteryl carbonate, ethyl cholesteryl carbonate, pentyl cholesteryl carbonate, and like carbonates are very useful in the present invention.

It will be appreciated by those skilled in the art that a pure cholesteric substance may have only a narrow color play range. However, where this color change does not occur at the temperature of interest, several stratagems permit coverage of a broad range of temperatures from 0° C., and even down to −40° C., up to and above 250° C. One method of varying the color play temperature range is to prepare a substance at a desired purity level, more impurities usually lowering the temperature range. One convenient method of carrying out this adjustment is to admix a plurality of chemically distinct chloesteric substances having different color play temperature ranges until the desired temperature range is obtained. Another method of adjusting the color play range is to prepare the substance in a highly purified form and to admix enough of a less refined aliquot or aliquots of the substance with the purer material until the desired change of color play range is obtained. For instance, in this latter aspect, a 99.99% pure oleyl cholesteryl carbonate can be prepared and admixed with less refined material. Those skilled in the art will have no difficulty in providing a desired transition temperature for use in the compositions and articles of the present invention. All parts, proportions, percentages and ratios herein are by weight unless otherwise stated.

The following tabulation will exemplify a few of the many color play regions obtained with the cholesteric substance or substances:

| Substance(s): | Color play region (° C.) |
|---|---|
| 80% cholesteryl oleyl carbonate<br>20% cholesteryl acetate | 0–4 |
| 95% cholesteryl oleyl carbonate<br>5% cholesteryl acetate | 16–18 |
| 65% cholesteryl oleyl carbonate<br>25% cholesteryl nonanoate<br>10% cholesteryl benzoate | 17–23 |
| 45% cholesteryl oleyl carbonate<br>45% cholesteryl nonanoate<br>10% cholesteryl benzoate | 26.5–30.5 |
| Cholesteryl cinnamate | 180–260 |
| 80% cholesteryl nonanoate<br>20% cholesteryl propionate | 45–65 |
| 20% cholesteryl butyrate<br>80% cholesteryl nonanoate | 55–75 |
| 20% cholesteryl methyl carbonate<br>80% cholesteryl nonanoate | 22–47 |
| 90% cholesteryl cinnamate<br>10% cholesteryl nonanoate | 140–250 |
| Cholesteryl benzoate | 146–178 |
| Cholesteryl butyl carbonate | 45–below 0 |
| 20% cholesteryl dihydrocinnamate<br>80% cholesteryl nonanoate | 64–67 |

It will accordingly be appreciated that one, two or more cholesteric substances can be mixed to obtain the requisite color play temperature range, and that both the temperature and the range of temperatures can be widely varied. It is desirable that the cholesteric substance(s) not crystallize at the lowest temperature at which they are held before use.

As disclosed above, a desired melting range can also be obtained by varying the purity of cholesteric substances. It is usually found that increasing the purity raises the temperature of the color play region and a narrowing of the range is also frequently obtained. It will of course be appreciated that the presence of excessive quantities of impurities will ultimately entirely prevent obtaining of the cholesteric phase, especially if the impurities themselves are not cholesteric substances. The cholesteric substance(s) can also comprise up to five percent or so of miscible materials such as fatty acid triglycerides to lower the range. As disclosed hereinafter, it is most desirable to protect the cholesteric substance from the milieu to obviate the imbibition of impurities by the cholesteric substances and thereby to maintain the desired color play temperature.

As an illustration, cholesteryl oleyl carbonate is prepared as described in "Detection of Liquid Crystals," AD 620 940, U.S. Department of Commerce (August 1965). A portion of the cholesteryl derivative is purified by solvent extraction and washed with methanol. The purified cholesteryl material is found to have a color play temperature of 21–22° C. Admixing 80 parts of this material with 20 parts of an unpurified material provides a color play temperature of 15–16° C.

The compositions according to this invention also contain a cholesteryl halide. Although cholesteryl fluoride can be prepared, the desired halides for use herein are cholesteryl chloride, cholesteryl bromide, cholesteryl iodide, and mixtures of these halides. The preferred halide for use herein is cholesteryl chloride.

The cholesteryl halide serves to provide a single color over a broad range of temperatures in which the cholesteric substance or substances are in the cholesteric phase. Thus, the compositions of the invention show a single color below their transition to the condition wherein they do not scatter visible light, i.e., the condition in which they become colorless. The color below the transition point can be selected according to the amount of cholesteryl halide used. As the quantity of halide is increased from about 15% of the composition up to about 40%, the color usually varies from deep violet to deep red. The quantity of halide used will also vary according to the particular cholesteric substances utilized. It is generally preferred to use about 20 to 30% of the cholesteryl halide in the thermometric composition.

These halides are conveniently prepared by refluxing the cholesterol with an excess (twice or more, stoichiometrically) of a thionyl halide for 48–72 hours and distilling the mixture thereafter to remove unreacted material. Generally, the purity of the halides is sufficient to permit the desired change of phase from the cholesteric. It is preferred that the halides be at least 90% pure. Such halides usually have a tendency to raise the color play temperature range of the cholesteric substance(s).

The reversion of the cholesteric substance in the presence of the cholesteryl halide from a non-cholesteric phase subsequent to exposure to the second temperature to the color of the cholesteric phase is prevented by the use of an oil-soluble dye, preferably a nitrogenous dye. The oil solubility is determined by considering the solubility of the dye in oleic or stearic acid and like long-chain fatty acids. The desirable dyes for use herein are the disazo and azine dyes. Dyes of this type and the processes for their production are described in Colour Index, e.g., at pp. 3409–3421 of volume 2. Broadly speaking, these dyes are prepared by the reaction of aniline or its derivatives. The nigrosines and indulenes are among the preferred dyes. Typical preferred dyes include C.I. Solvent Black 7 (C.I. 50415B), also sold as "Nigrosine base B," "Solvent Black 7 NJD," C.I. Solvent Blue 7 (C.I. 50400) also sold "Indulene Base 2B," C.I. Solvent Black 3 (C.I. 26150), also sold as "Oil Black BT," and the like. These are all nitrogen based dyes having a plurality of benzenoid rings.

The amount of dye used should be sufficient to prevent the immediate reversion of the chlolesteric substance to the cholesteric phase. It will be understood by those skilled in the art that the return of the mixture to the original color of the cholesteric phase can be either inhibited for a relatively short time, say, a few minutes to a few hours, or enough dye can be added to render the transition from the cholesteric to the non-cholesteric state essentially irreversible, regardless of temperature. There should not be so much dye as to obscure the color of the cholesteric substances-halide mixture, but too little dye will permit an undesirably rapid reversion. As little as one percent of the dye will usually prevent reversion to the chromatic condition for at least a few minutes and amounts up to 50% of the total composition can be used in some instances. The composition should accordingly contain from one percent to 50% dye. The preferred range with usual compositions is from two to ten percent dye. Six percent dye is usually sufficient to prevent reversion indefinitely.

The thermometric compositions so formulated will exhibit the typical colorful scattering of white light which is found to be typical of the cholesteric state. Yet, when the transition temperature is reached so that the substance passes into a non-cholesteric phase and the temperature is subsequently returned to the original temperature, the composition will not exhibit such cholesteric properties as the scattering of light. For many uses it is preferred to use thin layers of cholesteric materials, preferably layers on the order of from about 10 microns to about 5 mils in thickness. Since a mil is one-thousandth of an inch, this thickness is approximately equal to from 10 microns to about 0.12–0.15 mm. such thin layers can be used, for example, with infrared sensing devices to provide an image which will remain so long as the unchanged portions are not subjected to a temperature higher than the transition temperature. If such a temperature cannot easily be maintained under ambient conditions, a color or monochromatic photograph or other reproduction can be made of the image on the thermometric element.

Such elements have especial utility in recording the highest temperature to which an object has been exposed or which exists in the object. Thus, the thermometric element can be utilized in maximum-temperature thermometers, especially in clinical thermometers. The range for the transition temperature would be chosen to be between the normal oral or other temperature to be measured and the highest temperature to which sensitivity is desired. For instance, a clinical thermometer can be prepared from a thermometric element which passes from the color play range at 99.5° F. Such a thermometer could be inserted in the patient's mouth for a short period of time, removed and read, or alternatively, taken to a cetnral area, and there read at will to determine whether the patient has a significantly elevated temperature. It can readily be appreciated that such thermometric elements also provide a means of keeping a permanent or semi-permanent record of a patient's progress.

It will further be appreciated from the present description that a plurality of thermometric elements can be deposited on the same substrate with various transition temperatures. For example, thermometric compositions having transition temperatures of 98.6°, 99.5°, 100°, 101° and 103° could be placed on the same substrate. After removal from a patient's mouth, if all of the elements still exhibit the color of the cholesteric phase, the patient does not have an abnormally elevated temperature. On the other hand, if one, two or more elements have gone to a non-cholesteric phase (as evidenced by the absence of any color), the degree of pyrexia can readily be determined.

Figure 2:
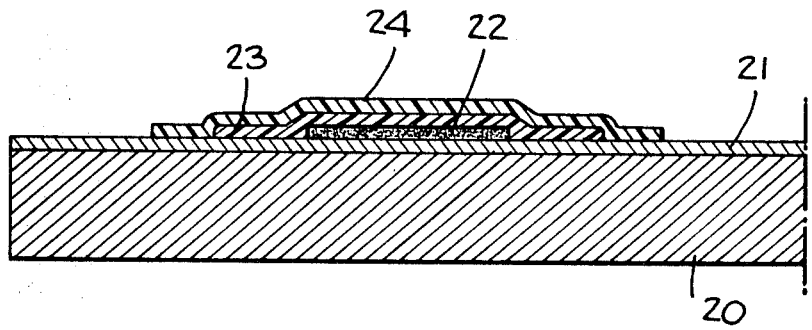

Because of the great utility and advantages of such thermometric articles, or thermometers, they are described in greater detail with reference to the accompanying drawings, wherein FIG. 1 is a view of a thermometer prepared according to the present invention, and FIG. 2 is a sectional view of another thermometric article so prepared.

FIG. 1 shows a simple thermometric article comprising a substrate or base 11 which is non-absorbent with respect to the thermometric composition. On substrate 11 is coated an area 12 of a cholesteric composition according to this invention. The cholesteric composition is overcoated with a thin film of material 13 to prevent contamination of the composition by dust, fluids, vapors, and the like. While the cholesteric composition 12 is shown as a rectangular area in FIG. 1, it will be appreciated that the configuration of the area can be any plane geometric figure.

It may be desirable to coat various different thermometric compositions onto a substrate in the form of numerals or letters which can either directly be read to obtain the temperature or which can be read by means of a code. In mass clinical use, for example, it may be desirable that the thermometric articles indicate temperature in terms of a set of code letters so that the patients will not be alarmed by knowledge that their temperatures are abnormal.

FIG. 2 shows a second embodiment of the invention which provides relatively inexpensive disposable clinical thermometers. Here, the base or substrate 20 is a piece of black paperboard stock which is coated with a thin layer of polyethylene 21 to protect the paper from the thermometric composition 22 coated thereon. The thermometric composition 22 is then overcoated with a layer of immiscible material 23 such as casein glue, polyvinyl alcohol, and the like. Where the thermometric article is to be utilized in an aqueous or humid environment it may be desirable to provide a second overcoating 24 of water-insoluble material such as polyethylene, methacrylate, and the like.

It will be appreciated by those skilled in the art that the base upon which the thermometric composition is coated can be any solid material. If the material would tend to absorb or to adversely affect the thermometric composition, it can first be coated with a thin film of an inert material as described above. The coating or coatings covering the thermometric composition must of course be sufficiently transparent or translucent in the thin layers used that the color change can be visually detected, unless substrate 11 is itself transparent. For optimum inspection of the phase change, the substrate or any coating 21 directly under the thermometric composition should be a dark color, and is preferably black, to absorb light directly incident thereon and permit more facile observation of the light scattered from the cholesteric substance. Further information on coating is disclosed in my copending application S.N. 808,319, filed on even date herewith and entitled "Thermometric Articles and Methods for Preparing Same."

It is a further property of the novel compositions according to this invention that, although they will revert to the cholesteric phase only after a time interval (or not at all), the cholesteric state can be re-established in the thermometric compositions by rubbing the surface thereof or agitating a mass thereof. Thus, where disposability is not an advantage, such as it would be with clinical thermometers, the initial state of the composition can be restored, and thermometric elements and articles according to the present invention can be used many times. Naturally, this same property would also be obtained in coatings utilized on articles the temperature of which is to be monitored, or the compositions can be coated on cellulose, nylon, or other tape or pressure-sensitive tape which can be affixed to the object to be monitored. As just one additional example of such utility, the bearing covers of electrical driving motors could be coated with the thermometric composition and then overcoated with a transparent protective film. If a bearing failed on one of the motors, the correct bearing could easily be discovered by examining the motor housings. After repairs on the bearing are completed, the thermometric element can be rubbed to restore the colored cholesteric state and any subsequent failure can similarly be monitored thereafter.

It will be appreciated from this description that electronic devices, printed circuit boards, light fixtures, electrical wiring, and other artifacts which are either temperature sensitive, or the failure of which produces a temperature rise, can similarly be monitored.

The compositions of this invention can also be used to coat a surface temporarily for production control or other testing purposes. The composition of the invention is dissolved in a suitable solvent or applied to the surface as-is by spraying, brushing, or like techniques. When testing is completed, the composition is removed by a solvent wash. If the material has become colorless due to having gone above the transition temperature, the agitation of dissolving it and removing it from the surface will usually restore it to the cholesteric state.

The following examples are given to illustrate embodiments of the invention as it is presently preferred to practice it. It will be understood that these examples are illustrative, and the invention is not to be considered as restricted thereto except as indicated in the appended claims.

Example I

A thermometric composition is prepared by admixing 30 parts of cholesteryl oleyl carbonate showing a color play at 5–6° C., 39 parts of cholesteryl oleyl carbonate showing a color play at 20–22° C., 25 parts of cholesteryl chloride having a melting point of 94–95° C., and six parts of Solvent Black 7 NJD nigrosine dye, made by Allied Chemical. At room temperature this mixture displays a green color in thin films.

When the temperature of a thin film of this material is heated to 37° C., the color disappears and does not reappear after cooling below 37° C., even two weeks after exposure to the higher temperature. Bulk quantities of the mixture behave in the same manner. Agitating the composition after it has been heated above 37° C. and returned to room temperature (about 23° C.), restores the original color.

Example II

A 10-mil (0.25 mm.) thick sheet of black polyvinyl chloride is coated by a silk-screen technique with a pattern of squares of the composition prepared in Example I. The thickness of the composition coated on the sheeting is about 2 mils. The sheeting and the thermosensing composition are then overcoated with casein white liquid glue and dried rapidly. After curing to dry the glue fully, a protective coating of impregnated acrylic polymer is sprayed onto the glue overcoat.

The sheeting is then cut into thin strips such as shown in FIG. 1. These strips containing the area of thermosensing material are used to determine the oral temperatures of patients. Those with temperatures higher than the normal 37° C. cause the composition to become colorless and to remain in that condition. The colorless thermometers can be reused by merely rubbing the surface of the acrylic overcoat to restore the original color.

Further compositions according to the present invention appear below, wherein all amounts are in parts, "ChCl" is cholesteryl chloride melting at 94–95° C.; "High ChOlC" is cholesteryl oleyl carbonate showing a color play at 20–22° C.; "Low ChOlC" is cholesteryl oleyl carbonate showing a color play at 5–6° C.; "ChNo" is cholesteryl nonanoate; and the temperature is that at which the thermosensing compositions became colorless and remain in that condition:

| Example | ChCl | High ChOlC | Low ChOlC | ChNo | Dye | Temperature, ° C. |
|---|---|---|---|---|---|---|
| III | 27 | 73 | | | ¹ 6 | 42 |
| IV | 27 | 27 | | 15 | ¹ 6 | 45.5 |
| V | 27 | 50 | 23 | | ¹ 6 | 38 |
| VI | 27 | 59 | 14 | | ¹ 6 | 35 |
| VII | 25 | 75 | | | ² 6 | 48 |

¹ Solvent Black 7 NJD as in Example I.
² Spirit Nigrosine SSB, made by Allied Chemical.

It will be appreciated from the present description that the compositions of Examples III–VII could be used to prepare thermometers as set forth in Example II. Moreover the cholesteryl bromide or iodide or mixtures of these halides with each other and/or with the cholesteryl chloride can be used. Similarly, an oil-soluble disazo dye can be used in lieu of the nigrosine azine dyes. Further, other alkanoic esters of cholesterol or alkyl carbonate esters of cholesterol can be used in the foregoing examples to provide a broad variety of temperatures and temperature ranges for the thermometric compositions. Likewise, other cholesteric materials such as corresponding derivatives of β-sitosterol, stigmasterol, ergosterol, and the like can be substituted with comparable results.

What is claimed is:

1. A thermometric composition comprising a mixture of at least one mesomorphic substance and at least one cholesteryl halide, the mixture exhibiting color in the cholesteric state at a first temperature and changing from that state at a second temperature, and an oil-soluble dye selected from the group consisting of disazo, indulene, or nigrosine dyes in an amount sufficient to obstruct said mixture from reverting to the color of the cholesteric state when the element is returned to the first temperature after being heated above the second temperature.

2. A composition according to claim 1 wherein the second temperature is in the range from 0° to 200° C.

3. A composition according to claim 2 wherein the temperature is from 36 to 42° C.

4. A composition according to claim 1 wherein the substance is an alkyl cholesteryl carbonate, an alkyl or aryl ester of cholesterol, or a mixture of the carbonate and the ester.

5. A composition according to laim 1 wherein the substance is an alkyl or aryl ester of cholesterol.

6. A composition according to claim 1 wherein the substance is an alkyl cholesteryl carbonate.

7. A composition according to claim 1 wherein the halide comprises from 15 to 40 percent of the composition.

8. A composition according to claim 1 wherein the halide is cholesteryl chloride.

9. A composition according to claim 1 wherein the dye comprises from about one to about 50 percent of the composition.

10. A composition according to claim 9 wherein the dye comprises from two to ten percent of the composition.

11. A thermometric element comprising a mixture of at least one mesomorphic substance and at least one cholesteryl halide, the mixture exhibiting color in the cholesteric state at a first temperature and changing from that state at a second temperature, and an oil-soluble dye selected from the group consisting of disazo, indulene or nigrosine dyes in an amount sufficient to prevent said mixture from reverting to the color of the cholesteric state when the element is returned to the first temperature after being heated above the second temperature.

12. A thermometric element according to claim 11 wherein the mixture is in a thin layer.

13. A thermometric element according to claim 12 wherein the layer thickness is from 10 microns to 0.15 mm.

14. A thermometric article comprising a base and a thin layer of thermometric composition according to claim 1 distributed on said base.

15. A thermometric article according to claim 14 wherein a plurality of different thermometric compositions are distributed on the base.

16. A thermometric article according to claim 14 wherein said composition is coated with a thin protective film.

References Cited

UNITED STATES PATENTS

| | | | |
|---|---|---|---|
| 2,544,659 | 3/1951 | Dreyer | 23—230X |
| 3,114,836 | 12/1963 | Fergason et al. | 350—160X |
| 3,401,262 | 9/1968 | Fergason et al. | 350—160X |
| 3,409,404 | 11/1968 | Fergason | 252—408X |
| 3,441,513 | 4/1969 | Woodmansee | 252—408 |

OTHER REFERENCES

"Optics and Spectroscopy," vol. XXXI, No. 3, September 1966, pp. 214–215, Makushenko.

"Liquid Crystals," "Scientific American," Fergason, vol. 211, No. 2, August 1964, pp. 76–82 and 85.

JOHN T. GOOLKASIAN, Primary Examiner

J. C. GIL, Assistant Examiner

U.S. Cl. X.R.

23—230; 73—356; 161—410; 350—160